(12) United States Patent
Whitted et al.

(10) Patent No.: US 6,369,471 B1
(45) Date of Patent: Apr. 9, 2002

(54) SLIP RING END (SRE) FAN HAVING COIL LEAD RETENTION FEATURE

(75) Inventors: Mitchell L. Whitted, Anderson; Steve J. Shields, Muncie, both of IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/723,498

(22) Filed: Nov. 28, 2000

(51) Int. Cl.[7] ............................... H02K 9/04
(52) U.S. Cl. .................. 310/62; 310/63; 310/71; 310/91; 310/263; 310/58
(58) Field of Search .................. 310/58, 52, 63, 310/67 R, 62, 263, 261, 71, 91

(56) References Cited

U.S. PATENT DOCUMENTS

| | | | | |
|---|---|---|---|---|
| 4,565,936 A | * | 1/1986 | Ikegami et al. | 310/62 |
| 4,588,911 A | | 5/1986 | Gold | 310/62 |
| 4,961,016 A | | 10/1990 | Peng et al. | 310/62 |
| 4,992,691 A | | 2/1991 | Mlynarz | 310/232 |
| 5,235,229 A | * | 8/1993 | Tanaka et al. | 310/62 |
| 5,241,230 A | * | 8/1993 | Tanaka et al. | 310/62 |
| 5,254,896 A | * | 10/1993 | Bradfield et al. | 310/263 |
| 5,625,244 A | | 4/1997 | Bradfield | 310/232 |

* cited by examiner

Primary Examiner—Burton S. Mullins
(74) Attorney, Agent, or Firm—Margaret A. Dobrowitsky

(57) ABSTRACT

An SRE fan has a hub, a carrier extending outwardly of the hub and a plurality of vanes on a first side of the carrier. The carrier has a second side opposite the first side that is configured to contact an engagement surface of a rotor segment. Channels are provided on the second side of the carrier. Rotor coil leads are surrounded by respective compressible insulated sleeves and are each routed through respective channels. The geometry of the channels is adapted to cooperate with the engagement surface of the rotor to enclose the channels and establish a uniform channel depth. The depth is selected to be less than an uncompressed diameter of the sleeves so as to provide a measure of compression when the fan contacts the rotor, holding the leads in place.

11 Claims, 2 Drawing Sheets

SLIP RING END (SRE) FAN HAVING COIL LEAD RETENTION FEATURE

BACKGROUND OF THE INVENTION

1. Technical Field

The present invention is directed toward rotating electric machines having a slip ring.

2. Description of the Related Art

A conventional alternator 10 is illustrated in FIG. 1 sometimes referred to herein as a generator. Alternator 10 has a rotor assembly generally designated by the reference numeral 20 and stator assembly generally designated by the reference numeral 15. The rotor assembly 20 includes a shaft 21 supporting all rotating magnetic circuit structures thereof including conventional pole-members 16A and 16B, rotor core 17 and field coil 18 wound upon bobbin 12. Additionally, all other non-magnetic circuit rotating structures are carried thereby, including air circulation fans 19 and 27 located at axially opposite sides of the pole-members, and a slip ring assembly 30 located at one extreme end of the shaft. Fan 27 is formed from sheet metal stock and spot welded to pole-member 16B while fan 19 is formed from an appropriate thermoplastic material and heat staked to tower extensions (not shown) from the field coil bobbin 12. The shaft 21 in turn is rotatably supported within a housing 26 by a pair of bearings 23 and 22. Bearing 23 is located between the slip ring assembly 30 and the fan 19.

Coil leads 18A of field coil 18 are wrapped about respective posts 12A of bobbin 12 and pass through holes 13 in fan 19. Slip ring assembly 30 is made of a pair of copper rings 31, each having a slip ring lead 32 joined such as by welding thereto. The copper rings and wires are molded into a thermoset material to complete the slip ring assembly. Slip ring assembly 30 is pressed onto the end of rotor shaft 21 and the slip ring leads 32 are routed into channels along the shaft 21 where they are joined, such as by twisting and welding, to the coil leads 18A of field coil 18 via a joint 24. The joint 24 is then bent to the surface of the fan 19 and received in a pyramid-shaped tab structure 25. The joint 24 is then secured to fan 19 by ultrasonic welding of the plastic material of the tab 25. Bearing 23 is assembled to pass over the slip ring assembly 30 to retain the lead wires 32 securely within the shaft channels. The configuration in FIG. 1, however, presents several manufacturing challenges which may affect long-term durability.

First, the weld connection at joint 24 may be made imperfectly, for example, where the weld bead contains a partial crack or fissure. Such a joint will normally pass electrical tests conducted during manufacture. However, during the service life of generator 10, the rotational forces (i.e., centrifugal forces) that come to bear on joint 24, either directly or indirectly (e.g., via flexure of the fan body when it rotates) may cause the crack to propagate until the electrical connection is broken entirely, resulting in an open condition in the field winding circuit. This will cause the generator to fail.

Second, the above-mentioned ultrasonic welding operation may incompletely melt the plastic in the vicinity of the joint 24, resulting in gaps or voids. These gaps or voids may allow the wires or joint 24 itself to move during operation of the generator (i.e., rotation of the rotor). This movement may fatigue the metal, causing it to break, resulting in an open circuit and failure of the generator. Additionally, a weld horn that is used in the ultrasonic welding operation may contact the wires or joint 24 directly (not just the tab 25). The high vibration imparted by the weld horn may fatigue the wires or joint 24, perhaps not severe enough to cause a break that could be detected during manufacture via electrical testing. Moreover, the weld horn may crush, flatten or otherwise deform the wires or joint, thereby weakening it. The wires/joint, thus weakened, may fail during operation of the generator.

Third, slip ring conductor 32 may be pulled too tight when joint 24 is made, causing it to rise slightly out of the channel in the shaft and fan hub where it is designed to reside. Bearing 23, when assembled onto shaft 21, may contact conductor 32, deforming or possibly cutting the wire's outer insulation. Such a condition will ground the rotor winding, causing the generator to fail.

Fourth, the connection of conductors 32 to respective slip rings 31 is conventionally made via brazing. As shown in FIG. 1, such connections are disposed proximate a radially outermost portion of the slip ring assembly 30. Rotational forces increase with increases in distance from the main axis, and may therefore weaken such connections, causing some to fail.

U.S. Pat. No. 5,625,244 to Bradfield discloses a slip ring and fan assembly having channels on an inside (i.e., rotor segment facing) surface of the fan for routing coil leads to the slip ring assembly. However, the channels do not provide any mechanism for retaining the leads.

There is therefore a need for an improved alternator and/or portions thereof that minimize or eliminate one or more of the problems as set forth above.

SUMMARY OF THE INVENTION

An object of the present invention is to provide a solution to one or more of the problems set forth in the Background. An advantage of a fan in accordance with the present invention is that it provides a mechanism, in cooperation with a rotor segment, to secure or retain a rotor coil lead without any additional manufacturing steps. Another advantage is that it eliminates the routing of leads on the outer, front surface of the fan (as described in the Background), eliminating the need for the front welding connection employed on conventional configurations. The present invention further minimizes or eliminates axial movement of the fan which has previously fatigued broken leads. Further, routing of the leads under the fan protects the leads from environmental conditions. Still another advantage of a fan according to the invention relates to its improved rigidity, which minimizes flexure and oscillation of the fan during operation (i.e., during the operation of an alternator that includes the inventive fan).

A fan is provided for use in a dynamoelectric machine of the type having a rotor with a rotatable shaft disposed along a longitudinal axis and a field coil having a pair of coil leads. The fan includes a hub portion having a central aperture configured to accommodate the shaft, and a carrier portion. The carrier portion extends radially outwardly from the hub and has a plurality of vanes on a first side thereof. The carrier also includes a second side opposite the first side configured to contact an engagement surface of the rotor. The carrier further includes a pair of channels on the second side for routing of the coil leads. According to the invention, when the fan is assembled into the dynamoelectric machine against the rotor, each channel has a substantially uniform depth taken relative to the rotor's engagement surface over a predetermined radial length. In a preferred embodiment, the uniform depth is selected so as to allow the use of a compressible insulating sleeve for surrounding each coil lead. The lead/sleeve combination is compressed when the fan is assembled against the rotor. The compression provides a retention function, holding the leads in place during the remainder of the manufacture of the machine as well as during operation.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 2:
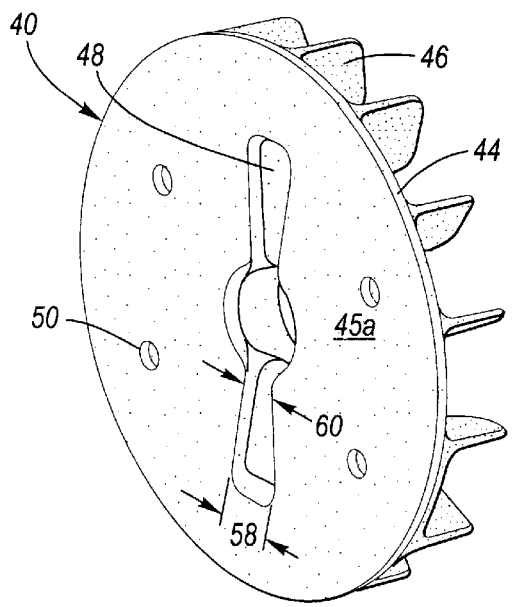
FIG. 2 is a rear, perspective view of a fan according to the present invention showing a pair of channels.

Referring now to the drawings wherein like reference numerals identify like components in the various views, FIG. 2 is a rear, perspective view of a fan 40 in accordance with the present invention. Fan 40 is substantially circular at its outer diameter and includes an integral hub region 42, a carrier portion 44 having a first side 45a and second side 45b, and a plurality of vanes 46.

Figure 3:
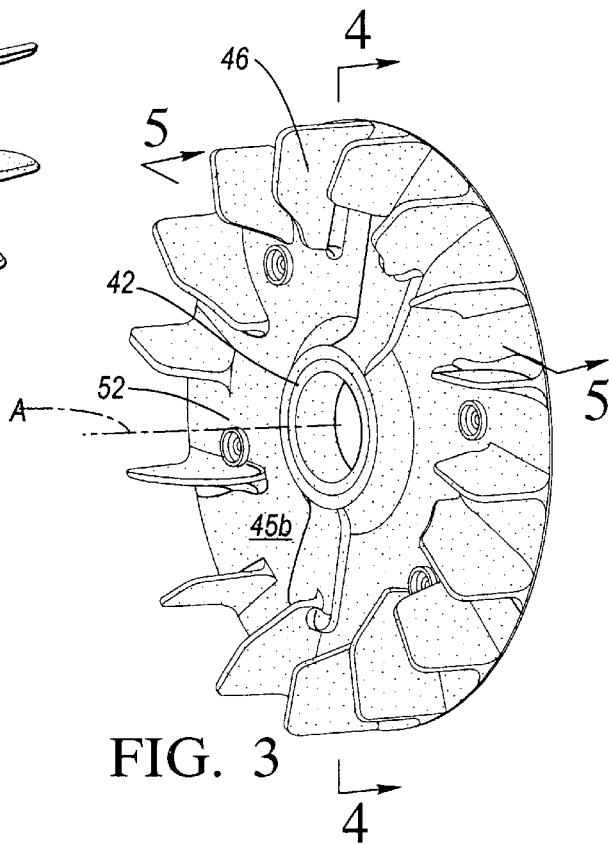
FIG. 3 is a front, perspective view of the fan of FIG. 2.

Hub 42 has a central aperture through which shaft 21 passes and locates the fan in a substantially concentric fashion (i.e., the axis of the shaft 21 and the axis of fan 40, designated "A" in FIG. 3, are substantially coincident). In the illustrated embodiment, carrier 44 is generally disc-like, and extends radially outwardly from hub 42. As shown more clearly in FIG. 4, a first circumferentially-extending section 44a extends radially outwardly from the outside diameter of hub 42 and is of a substantially uniform thickness. A second circumferentially-extending section 44b extends radially outwardly from the outside diameter of first section 44a (viz. coinciding substantially with the inside diameter of vanes 46) to an radially outermost edge of carrier 44. The second section 44b has a decreasing thickness taper towards the outermost edge. The uniform thickness first section represents a structural improvement over the conventional design. The foregoing cross-sectional geometry improves rigidity, decreasing flexing and oscillation of the fan 40 during use.

Carrier 44 further provides for the attachment of a plurality of vanes 46 toward the outer periphery thereof on side 45b. The vanes 46 project axially away from side 45b (i.e., the side away from the rotor pole member), and further project substantially radially from the axis "A" of rotor shaft 21. The particular shape and alignment of vanes 46 may be determined in accordance with desired airflow characteristics and noise considerations.

Figure 1:
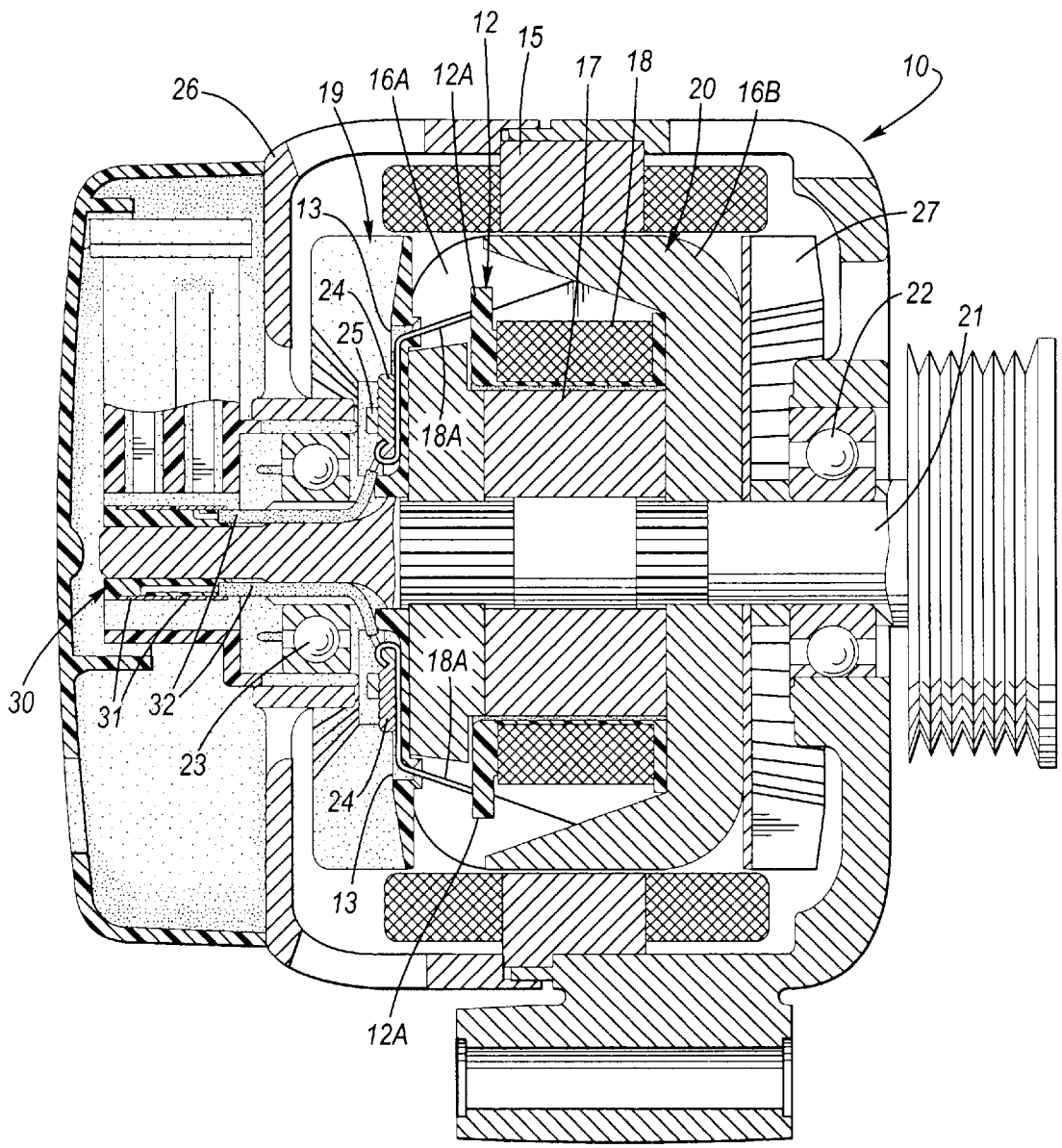
FIG. 1 is a sectional view through a conventional alternator having a slip ring end (SRE) fan.

Referring to FIG. 2, in the illustrated embodiment, carrier 44 includes a pair of channels 48 on side 45a and a plurality of apertures 50. FIG. 3 shows a corresponding plurality of bosses 52. Apertures 50 are configured to receive corresponding spool posts from a rotor field winding bobbin. During assembly (described below), the spool posts are slipped through apertures 50, and the ends are melted to bosses 52. Through the foregoing, fan 40 may be attached to a dynamoelectric machine such as the generator 10 in FIG. 1.

Figure 4:
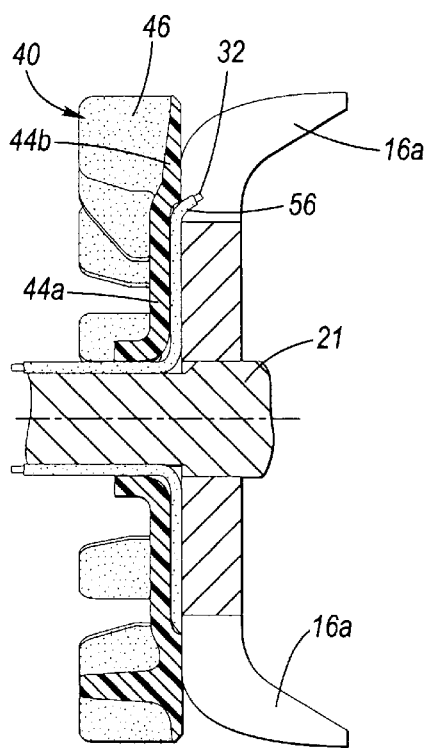
FIG. 4 is a simplified sectional view taken substantially along lines 4—4 in FIG. 3.

Each channel 48 is configured to allow routing of a respective rotor coil lead, such as lead 32 in FIG. 4, from the rotor field bobbin through the fan to a slip ring assembly for termination. The channels 48 provide a protected pathway for the rotor coil leads since they exist between the fan and rotor segment 16A (best shown in FIGS. 4 and 5). In a preferred embodiment, the coil leads are surrounded by a compressible electrical insulating sleeve 56. As will be described in detail below, sleeve 56 may be compressed and whose restoration force provides a retention feature for the coil leads in the channel between the fan and the rotor segment 16A. Sleeve 56 may comprise materials well known to those of ordinary skill in the art that provide electrical insulation as well as a measure of elastic compressibility, such as a fiberglass woven, acrylic impregnated sleeve. In an alternate embodiment, the sleeve may be silicone impregnated. It should be understood that there are a wide variety of alternatives for sleeve 56 which are within the spirit and scope of the present invention.

With further reference to FIG. 2, each channel 48 has a first angular width, designated by reference numeral 58, taken at a radially outermost portion of the channel. Each channel 48 also has second angular width designated at 60 taken at a radially innermost portion of the channel. Width 60 is less than width 58. The geometry of the channels is such that it takes into account any variation in the angular location (i.e., 0 location) of the segment root area of the channel (i.e., the radially outermost area of the channel where the rotor coil lead enters) relative to rotor segment 16A. This variation may be expected to occur due to various stackup factors. The width of channels 48 narrows as the coil leads approach the central shaft aperture, providing a guiding function.

FIG. 4 is a section view taken along lines 4—4 of FIG. 3. In the illustrated embodiment, each channel 28 extends in a direction that is substantially normal to longitudinal axis "A".

Figure 5:
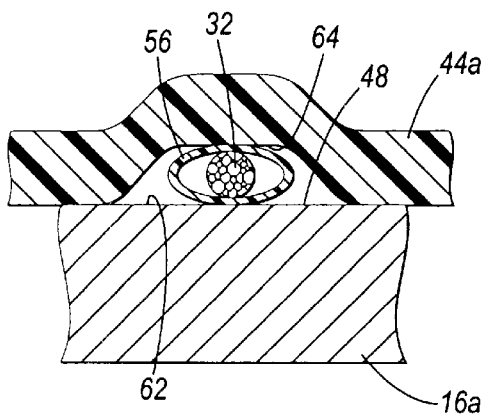
FIG. 5 is a simplified sectional view taken substantially along lines 5—5 in FIG. 3, showing a rotor coil lead/insulating sleeve held in place.

Fan 40, as described above, provides a mechanism for retaining rotor coil leads securely in place, especially during use, in order to reduce or eliminate movements that may cause wire fatigue and wire breaks. The area of fan 40 that is located near channel 48 on side 45a is configured to contact an engagement surface 62 of rotor segment 16A (FIG. 5). This contact, in effect, establishes a closed pathway for coil 32/sleeve 56. Each channel 48 is arranged, therefore, to cooperate with surface 62 to form a substantially uniform depth channel relative to surface 62, and a channel floor 64. This uniform depth extends over a predetermined length in the radial direction as shown in FIG. 4. In the illustrated embodiment, both the channel 48 and engagement surface 62 are oriented to be substantially normal to longitudinal axis "A". It should be understood, however, that other complementary geometries between engagement surface 62 and back side 45a of fan 44 may be implemented, and achieve the same retention feature via a uniform depth channel. The channel depth, as well as other geometrical parameters of channel 48 are selected in such a way as to allow the fan 40 and rotor segment 16A to trap the rotor coil leads, preferably surrounded by compressible sleeve 56, without any addition manufacturing steps over conventional configurations. In one embodiment, the depth of channel 48 is slightly less than an uncompressed diameter of sleeve 56. This allows adequate elastic deformation of sleeve 56. Compressible sleeve 56, in combination with channel 48, therefore allow retention of the rotor coil leads without subject to damage due to subsequent manufacturing processes.

With continued reference to FIGS. 4 and 5, the assembly process will be described. First, fan 40 is molded having the features described and illustrated herein. In a preferred embodiment, a thermoplastic material is used, selected based on expected operating temperatures, rigidity, etc. These and other parameters are well known to those of ordinary skill in the art. For example only, the material may be glass filled, incrementally toughened Polyamide 6/6 Nylon 6/6)). Other materials may also be used.

The coil leads 32 from the rotor field bobbin are then placed inside of respective insulated compressible sleeves 56, and are then routed across the top of rotor segment 16A and then radially inwardly toward and into wire routing slots cut into shaft 21. The leads are then extended longitudinally away from the rotor in the shaft slots. The fan 40 is then placed over the four spool posts (not shown) so that the post ends are aligned with and enter apertures 50.

The hub portion 42 of fan 40 is then pressed fully onto shaft 21 until side 45a contacts surface 62 of rotor segment 16A. This orientation is shown in cross-section in FIG. 4. This step causes the closed channel to bear down and compress the insulated sleeves 56. Next, the four plastic spool posts are melted down (e.g., via ultrasonic welding or other means) against respective bosses 52 on side 45b of fan 40. This securing step aids in holding the fan 40 in place, and maintains compression on the coil leads 32. Next, the entire subassembly of the alternator built to this point is dipped in varnish or other suitable material and allowed to cure. Once cured, further manufacturing steps may be performed.

One advantage of the present invention is that it provides a fan that is more rigid than conventional configurations. Improving rigidity reduces flexure and oscillations during operation. In addition, the geometry of the channels allows both a routing function as well as a retention function with regards to the rotor coil leads.

What is claimed is:

1. A fan for a dynamoelectric machine wherein said dynamoelectric machine includes a rotor with a rotatable shaft along a longitudinal axis and a field coil having a pair of coil leads, said fan comprising:
    a hub having a central aperture configured to accommodate said shaft;
    a carrier portion extending radially outwardly from said hub having a plurality of vanes on a first side thereof, said carrier having a second side opposite said first side configured to contact an engagement surface of said rotor, said carrier including a pair of channels on said second side for routing said coil leads;
    wherein said channel has a substantially uniform depth relative to said engagement surface over a predetermined radial length and wherein said channel has a first angular width at a radially outermost portion, and a second angular width at a radially innermost portion, said second angular width being less than said first angular width.

2. The fan of claim 1 wherein said channel extends in a direction that is substantially normal to said longitudinal axis.

3. The fan of claim 1 wherein said carrier includes a first circumferentially-extending radial section and a second circumferentially-extending radial section, said first section extending from the hub and having a substantially uniform thickness.

4. The fan of claim 3 wherein the second section extends outwardly from said first section and has a decreasing thickness taper towards a radially distal edge thereof.

5. The fan of claim 1 wherein said channel depth is selected so as to accommodate at least one of said coil leads surrounded by an insulating sleeve.

6. The fan of claim 5 wherein said channel depth is selected so as to accommodate in compression the coil lead and sleeve to thereby effect a coil lead retention feature.

7. The fan of claim 1 wherein said channels are closed to said first side at a radially outermost portion.

8. A dynamoelectric machine comprising:
    a rotor with a rotatable shaft along a longitudinal axis;
    a field coil having a pair of coil leads;
    a fan having a hub with a central aperture configured to accommodate said shaft, a carrier portion extending radially outwardly from said hub having a plurality of vanes on a first side thereof, said carrier having a second side opposite said first side configured to abut an engagement surface of said rotor, said carrier including a pair of channels on said second side for routing said coil leads; and
    wherein said channel has a substantially uniform depth relative to said engagement surface over a predetermined radial length, said channel depth being selected so as to accommodate in compression at least one of said coil leads surrounded by an insulating sleeve to thereby effect a lead retention feature, said channel being closed to said first side at said radially outermost portion, and wherein said channel has a first angular width at a radially outermost portion, and a second angular width at a radially innermost portion, said second angular width being less than said first angular width.

9. The machine of claim 8 wherein said channel extends in a direction that is substantially normal to said longitudinal axis.

10. The machine of claim 8 wherein said carrier includes a first circumferentially-extending radial section and a second circumferentially-extending radial section, said first section extending from the hub and having a substantially uniform thickness.

11. The machine of claim 10 wherein the second section extends outwardly from the first section and has a decreasing thickness taper towards a radially distal edge thereof.

* * * * *